United States Patent [19]

Tamura et al.

[11] Patent Number: 5,689,481
[45] Date of Patent: Nov. 18, 1997

[54] METHOD OF ACCESSING MULTIFILE STORAGE MEDIUM AND LIBRARY SYSTEM

[75] Inventors: Akiyori Tamura, Hiratsuka; Kazuaki Tanaka, Yokohama; Tatsuo Namba; Naoki Hirosawa, both of Odawara, all of Japan

[73] Assignees: Hitachi, Ltd., Tokyo; Hitachi Computer Peripherals Co., Ltd., Odawara, both of Japan

[21] Appl. No.: 137,979

[22] Filed: Oct. 19, 1993

[30] Foreign Application Priority Data

Oct. 20, 1992 [JP] Japan .................................. 4-281407

[51] Int. Cl.$^6$ .................................................. G11B 17/22
[52] U.S. Cl. ........................ 369/30; 369/34; 369/38
[58] Field of Search .............................. 369/30, 36, 33, 369/34, 75.2, 75.1, 77.1, 38; 395/275, 325; 360/98.05, 92

[56] References Cited

U.S. PATENT DOCUMENTS 5,357,495  10/1994  Solhjell ........................ 369/34
5,386,516  1/1995  Monahan et al. ................ 369/30

FOREIGN PATENT DOCUMENTS 0388056  9/1990  European Pat. Off. .

*Primary Examiner*—Ali Neyzari
*Attorney, Agent, or Firm*—Antonelli, Terry, Stout & Kraus, LLP.

[57] ABSTRACT

A method of accessing a multifile storage medium and a library system. The library system includes recording/reproducing apparatuses for performing a recording/reproducing operation on the multifile storage medium, a plurality of recording/reproduction control units for controlling transaction of information with a host, a plurality of buffers provided between the recording/reproduction control units and the recording/reproducing apparatuses, a library control unit for controlling the whole library system, a directory for recording correspondence between the individual multifile recording media and a plurality of files stored therein, a shelf for housing the multifile storage media and handling devices. The plural buffers can be accessed independently of one another. Plural files are transferred between the buffers and the storage medium on a file-by-file basis. The access requests to the files are disposed of within the buffer.

10 Claims, 5 Drawing Sheets

FIG. 2

| FILE NUMBER | CARTRIDGE ID | VSN | ATTRIBUTES | | | | STATISTICAL INFORMATION | | | |
| | | | PROTECT | SCRATCH | ACTIVE | RESERVE | DATE OF REGISTRATION | ERROR COUNT | NUMBER OF USES | NUMBER OF R/W BLOCKS |
|---|---|---|---|---|---|---|---|---|---|---|
| 1 | VSN0 | VSN00 | 1 | 0 | 1 | — | 92/07/01 | 0 | 10 | 1024 |
| | | VSN01 | 1 | 0 | 0 | — | 92/07/01 | 1 | 5 | 1024 |
| | | VSN02 | 0 | 1 | 0 | — | 92/07/01 | 0 | 10 | 10 |
| | 010101 | VSN0n | 1 | 0 | 1 | — | 92/07/01 | 0 | 0 | 0 |
| 2 | VSN2 | VSN20 | 1 | 0 | 1 | — | 90/05/01 | 10 | 5000 | 10000 |
| | | VSN21 | 0 | 0 | 1 | — | 90/05/01 | 1 | 0 | 0 |
| | | VSN22 | 0 | 0 | 1 | — | 90/05/01 | 0 | 0 | 0 |
| | 020101 | VSN2n | 0 | 1 | 0 | — | 90/05/01 | 0 | 0 | 0 |
| N | VSNN | VSNN0 | 0 | 1 | 0 | — | 91/01/01 | 2 | 1 | 100 |
| | 081502 | ⋮ | ⋮ | ⋮ | ⋮ | ⋮ | ⋮ | ⋮ | ⋮ | ⋮ |

METHOD OF ACCESSING MULTIFILE STORAGE MEDIUM AND LIBRARY SYSTEM

BACKGROUND OF THE INVENTION

The present invention relates to a method of accessing a multifile storage medium and a library system. More particularly, the invention is concerned with a technique which can effectively and advantageously be applied to management and control of a library system designed to store portable storage media of large capacity such as optical disks, helical scan magnetic tapes and the like.

As an external storage device for an information processing system, there are known magnetic tape apparatuses in which magnetic tapes are used as the medium for storing information or data. Further, in order to satisfy a demand for automation and a large capacity storage facility in various on-line works, there has been developed a magnetic tape library system in which a number of cartridge type magnetic tapes housed within a shelf are automatically mounted/demounted on/from recording/reproducing apparatuses.

Ordinarily, a volume of conventional tape in which tracks are formed longitudinally in parallel with each other has a storage capacity of about 200 MB, and it is a general practice to store one file in one medium in view of simplification and facilitation of management and manipulation.

SUMMARY OF THE INVENTION

In the recent years, in the magnetic tape library system, there arises a demand for further increase of the storage capacity as well as reduction in the space for installation. As an attempt to cope with such demand, it will be possible to implement an external information storage unit in which a multifile storage scheme is adopted for storing a plurality of files in a single volume of magnetic tape whose storage capacity is significantly increased when compared with the conventional tape (about one hundred times as large as that of the latter) by resorting to the use of a recording scheme such as that adopted in the helical scan magnetic tape for storing an increased amount of data. It is expected that with the multifile external storage unit mentioned above, a remarkable increase in capacity and a reduction of space can be realized when compared with the conventional magnetic tape storage device.

However, application of the multifile storage medium of the type described above to the conventional library system will be accompanied with a problem that a deadlock (i.e., a phenomenon in which an access to a file is suspended when another file is being used) takes place upon occurrence of simultaneous accesses to a plurality of files stored in one and the same multifile storage medium because of the presence of a plurality of files in one volume of the multifile storage medium. Obviously, such problem has to be avoided.

Accordingly, it is an object of the present invention to provide a technique or method of accessing a multifile storage medium which can realize simultaneous access to a plurality of files stored in a multifile storage medium without giving rise to the problem of deadlock.

Another object of the invention is to provide a library system which allows simultaneous access to a plurality of files contained in a single multifile storage medium without suffering from the problem of deadlock.

It is a further object of the present invention to provide a library system in which a multifile storage medium can be employed and operated without need for alteration of the interface with the host system.

In view of the above and other objects which will become more apparent as this description proceeds, there is provided according to an aspect of the present invention a method of accessing a portable multifile storage medium which stores a plurality of individual files in one and the same medium, in which the individual files are transferred on a file-by-file basis between the multifile storage medium and a plurality of buffers which can be accessed independently of one another, and in which access requests to the individual files are responded to within or on the buffers (i.e., without resorting to other means provided other than the buffers).

Further, according to another aspect of the invention, there is provided a library system which comprises portable multifile storage media, each storing a plurality of files in the same respective storage media and managed with respective independent identification symbols, a shelf for housing the multifile storage media, medium driving apparatuses for performing an information recording/reproducing operation for the multifile storage media, handling devices for performing transportation of the multifile storage media between the medium driving apparatuses and the storage shelf, a control information storing unit for recording control information indicating correspondence between the identification symbols and the multifile recording media, and a control unit for mounting/demounting the multifile storage medium on/from the medium driving apparatuses in accordance with the identification symbol received from a host system and the control information.

In a preferred mode for carrying out the invention, the library system may include a plurality of buffers shared by the medium driving apparatuses, which buffers are capable of being accessed independently of one another, wherein given ones of the plural files are transferred to the individual buffers on a file-by-file basis so that access requests for the plural files are responded to or disposed of in parallel within the buffers.

In another preferred mode for realizing the library system, a plurality of access requests may be so optimized that the plural access requests conform to a physical sequence in which the plural files stored in the multifile storage medium are accessed, by suspending correspondingly a plurality of access requests for a plurality of the files stored in the multifile storage medium.

In a further mode for carrying out the invention, the control information stored in the control information storage unit may be recorded on a portion of the multifile storage medium.

In a library system according to the invention, a helical scan magnetic tape or an optical disk may be used as the multifile storage medium.

In the multifile medium accessing method according to the invention, a plurality of files contained in a same multifile storage medium can simultaneously be accessed without bringing about the problem of deadlock owing to the fact that a plurality of files stored in the same multifile storage medium are transferred to the buffers on a file-by-file basis and that the access requests are responded to within the buffers.

In the library system according to the present invention, any given file contained in a given multifile storage medium can be accessed on the basis of a corresponding one of the identification signals identifying the individual file and the control information indicating correspondence to the multifile storage media as supplied from the host system without need for alteration of the interface with the host system.

Further, in the library system according to the invention, the individual files contained in the multifile storage medium are transferred on a file-by-file basis to a plurality of buffers shared by the medium driving apparatuses, whereby the access requests to the individual files can be responded to or disposed of within the respective buffers. Thus, the problem of deadlock can be suppressed while ensuring simultaneous access to a plurality of files stored in the multifile storage medium.

BRIEF DESCRIPTION OF THE DRAWINGS

FIG. 2 is a view showing, by way of example, contents of a directory provided for a library control unit;

DESCRIPTION OF THE PREFERRED EMBODIMENTS

Now, description will be made in detail of a method of accessing a multifile storage medium and a library system according to a preferred or exemplary embodiment of the invention.

Figure 1:
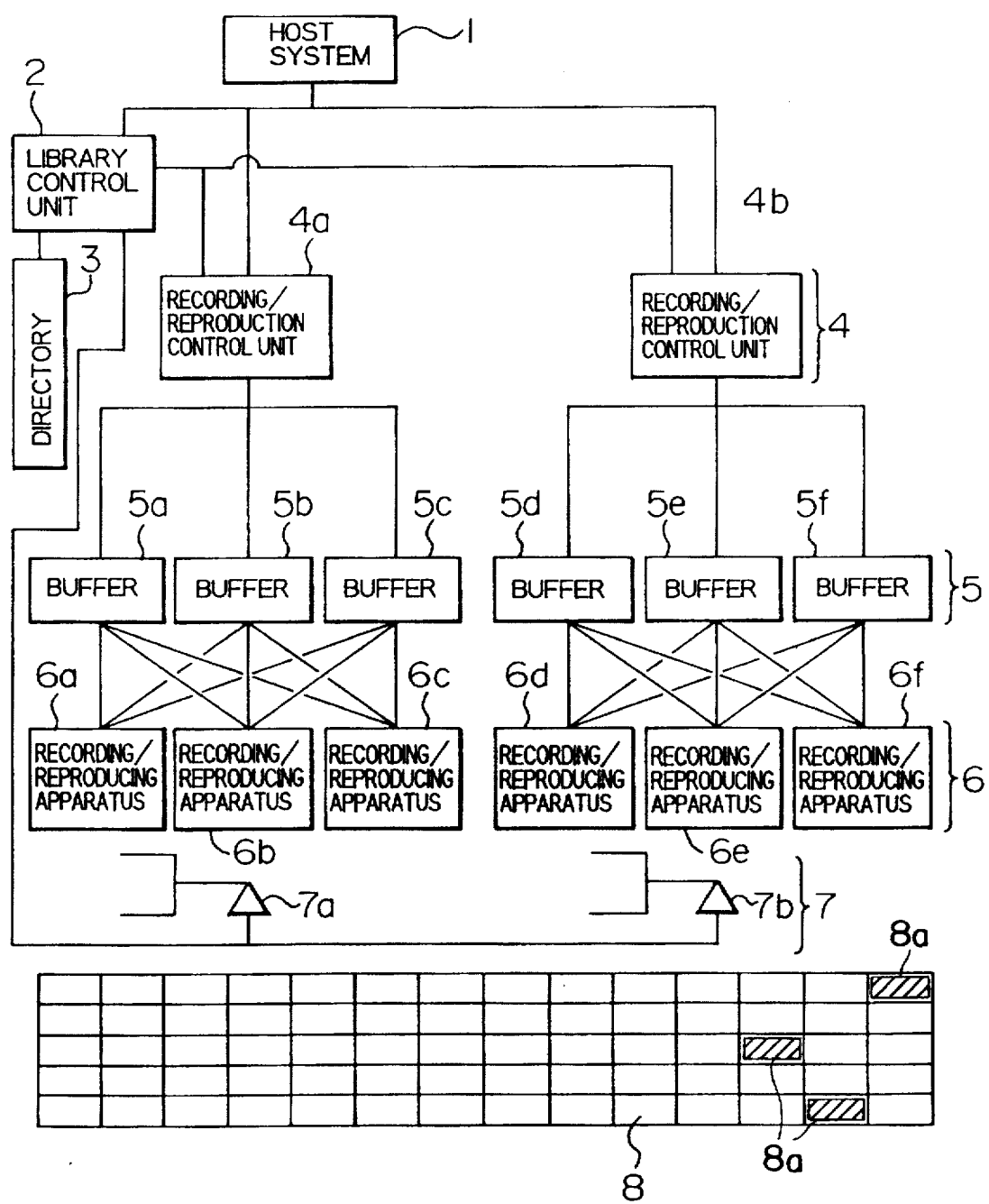
FIG. 1 is a block diagram showing an exemplary configuration of a library system according to an embodiment of the invention.

FIG. 1 is a block diagram showing an exemplary structure of a library system according to an embodiment of the invention. Referring to the figure, the library system includes a library control unit 2 which is in charge of controlling the whole system on the basis of commands issued by a host system 1, a plurality of medium driving units or recording/reproducing apparatuses 6a to 6f (collectively denoted by the numeral 6) for performing recording/reproducing operations on a helical scan magnetic tape 8a as mounted in a storage shelf 8 in which cartridges, each housing a volume of a helical scan magnetic tape 8a, are accommodated, handling devices 7a and 7b (generally denoted by the numeral 7) for transporting a helical scan magnetic tape 8a between the storage shelf 8 and the recording/reproducing apparatus 6 for exchanging the helical scan magnetic tapes 8a, and a plurality of recording/ reproduction control units 4a and 4b (generally denoted by the numeral 4) which are interposed between the recording/ reproducing apparatuses 6 and the host 1 for the purpose of controlling data transfers between the host 1 and the recording/reproducing apparatuses 6.

The storage capacity of one volume of a the helical scan magnetic tape 8a is significantly large when compared with that of the magnetic tape known heretofore. More specifically, a plurality of files (volumes) each having the capacity of the conventional magnetic tape are stored together in one helical scan magnetic tape 8a.

A plurality of buffers 5a to 5f (collectively designated by the numeral 5) each constituted, for example, by a semiconductor memory are interposed between the recording/ reproducing apparatuses 6 and the recording/reproduction control units 4. The capacity of each buffer 5 is so set as to be capable of storing a respective one of the files (volumes) contained in a helical scan magnetic tape 8a.

In the case of the instant embodiment, a plurality of recording/reproducing apparatuses 6a to 6c (or 6d to 6f) are operated under the control of the recording/reproduction control unit 4a (or 4b) with the buffers 5a to 5c (or 5d to 5f) being shared by these recording/reproducing apparatuses 6a to 6c (or 6d to 6f), wherein the recording/reproduction control unit 4a (or 4b) can make access to each of the buffers 5a to 5c (or 5d to 5f) independently of one another. The information or data read/write processing performed for a helical scan magnetic tape 8a from the host system 1 is effected on a file-by-file basis via a buffer 5.

The library control unit 2 is adapted to control the transportation of a helical scan magnetic tape 8a to or from the storage shelf 8 and mounting/ demounting of the tape 8a on or from the recording/ reproducing apparatus 6 as well as the access of the recording/reproducing apparatus 6 to the magnetic tape 8a.

As is illustrated in FIG. 2, there is provided for the library control unit 2 a directory 3 for storing the cartridge identifier (ID) for an individual helical scan magnetic tape 8a accommodated within the library system, file or volume serial numbers (hereinafter also referred to as or VSNs in abbreviation) allocated to a plurality of files stored in the helical scan magnetic tape 8a, attributes and other information. With the aid of this directory 3, it is possible to specify the cartridge ID of the helical scan magnetic tape 8a in which the file of the VSN designated by a command issued from the host system is contained and search the file of concern from the individual files each of a size corresponding to the storage capacity of one volume of a conventional magnetic tape.

Upon registration of the helical scan magnetic tape 8a in the storage shelf of the library system, the library control unit 2 divides the helical scan magnetic tape 8a into areas each of a fixed length and allocates the designated VSN to all the areas as if a plurality of conventional magnetic tapes which are not of the helical scan type exist in the areas, whereon data, such as the cartridge ID, VSNs, the date of registration, attributes, statistical information and the like are entered in the directory 3 of the library control unit 2.

Writing of the directory information or data mentioned above in the helical scan magnetic tape 8a is not performed at the time of registration of the cartridge in the library system, but is effected at the time of unloading the helical scan magnetic tape 8a after the access has actually been made thereto. This recording of the directory data in the helical scan magnetic tape 8a is conducted for securing a copy of the data for the purpose of restoration of the directory 3 provided for the library control unit 2 when the directory 3 is destroyed for some reason or other. Generation as well as updating of the copy is performed when the helical scan magnetic tape 8a is unloaded.

Figure 3:
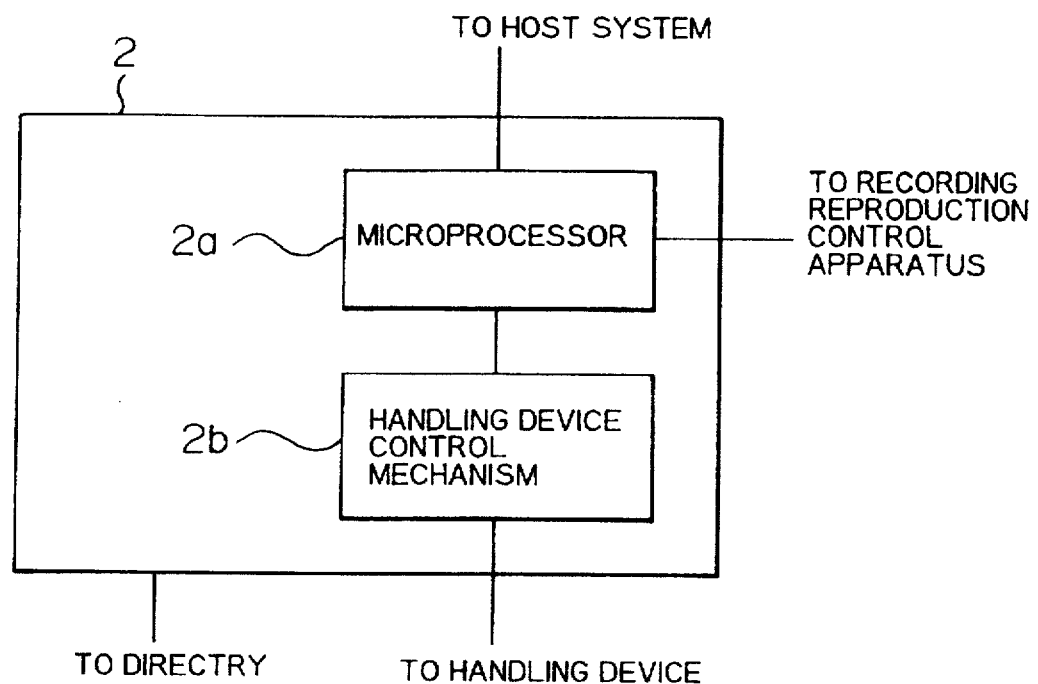
FIG. 3 is a block diagram showing a structure of the library control unit.

FIG. 3 is a block diagram showing a structure of the library control unit 2. The library system includes the host system 1, the recording/reproduction control units 4 for controlling the transfer and recording/reproduction of data to be recorded/reproduced with the host system 1 and the library control unit 2 for controlling the whole system. To this end, the library control unit 2 includes a microprocessor 2a and a handling device control mechanism 2b for controlling the handling devices 7 (7a, 7b).

When a transportation command is issued to the library control unit 2 from the host system 1, the microprocessor 2a operates the handling device 7 though the medium of the handling device control mechanism 2b to thereby effectuate the transportation of the recording medium. Further, in response to the command of the host system 1, the microprocessor 2a controls the directory 3 and the recording/reproduction control unit 4.

Next, operation of the system according to the instant embodiment will be described by reference to FIGS. 4, 5 and 6.

Figure 5:
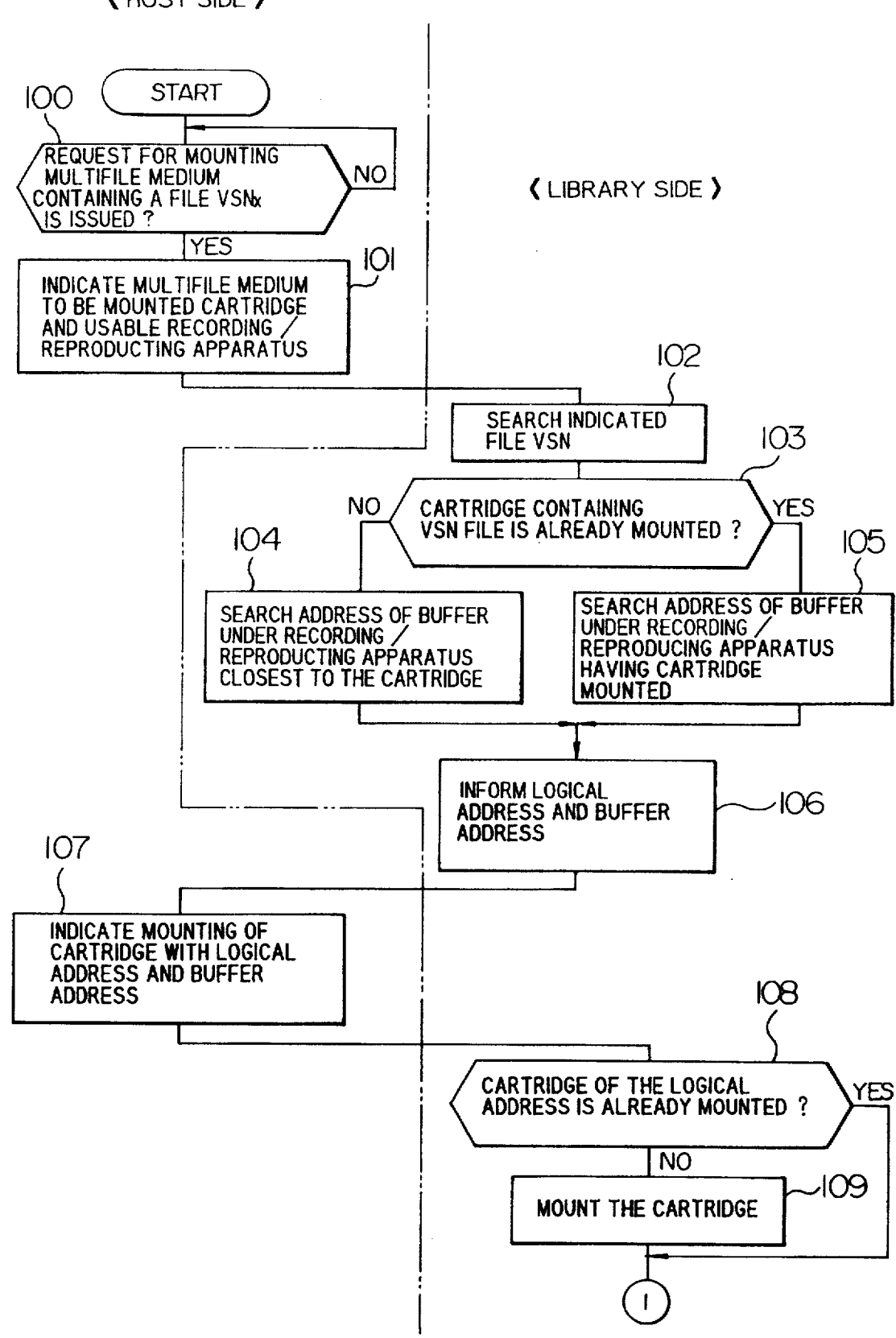
FIG. 5 is a flow chart for illustrating a method of accessing a multifile storage medium and operations performed in a library system according to an embodiment of the invention.
Figure 6:
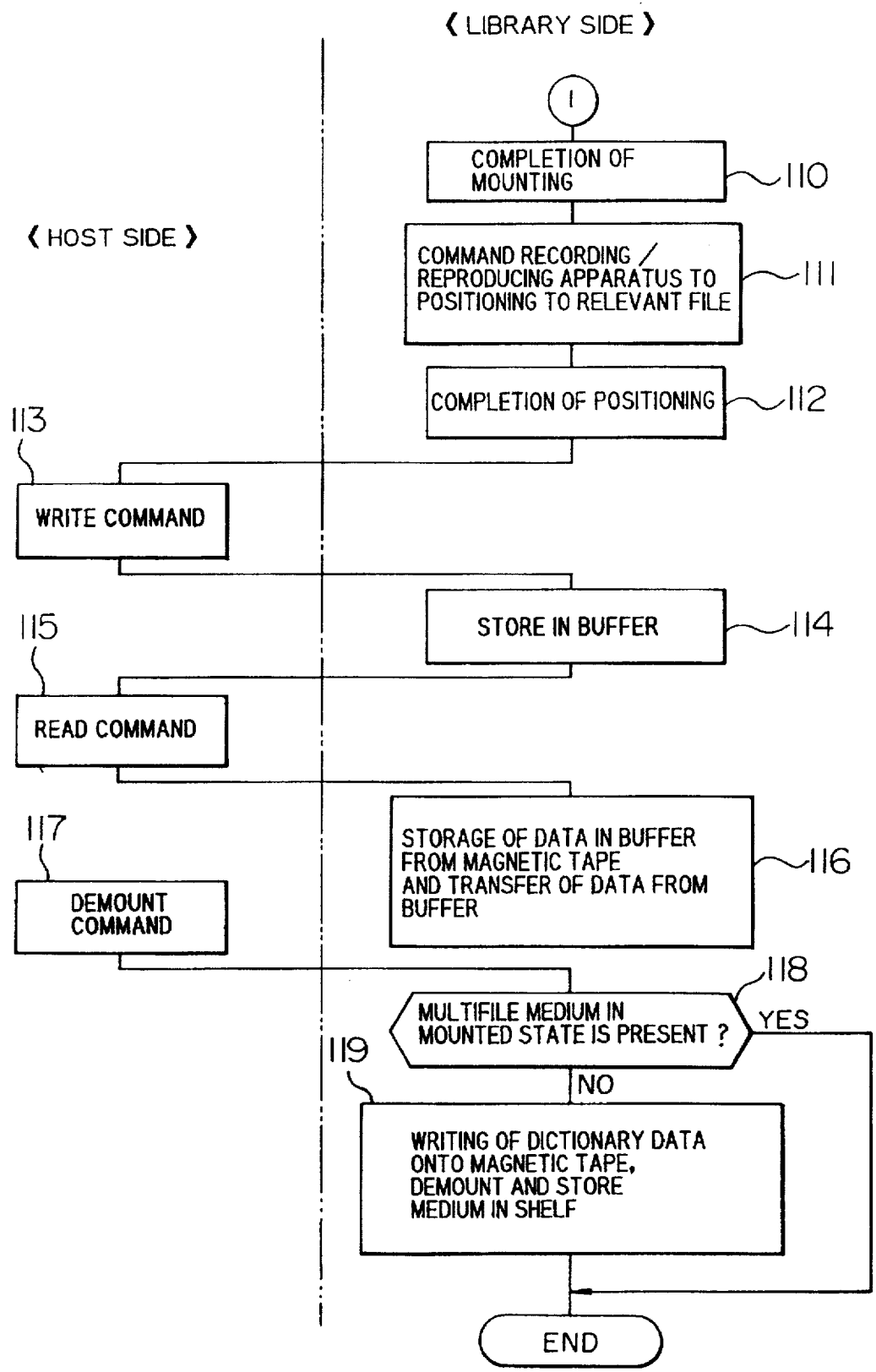
FIG. 6 is a flow chart for illustrating a method of accessing a multifile storage medium and operations performed in a library system according to another embodiment of the invention.

Referring to FIGS. 5 and 6, when the host system 1 issues an access request for one or a plurality of files of particular VSNs (step 100), the host system 1 transfers the VSNs of the files to be accessed to the library control unit 2 together with a logical address of the recording/reproducing apparatus 6 which is connected to the host 1 and which can be used (step 101). The library control unit 2 then searches the VSNs (step 102) to thereby determine the recording/reproducing apparatus 6 which is located closest to the place where one or plural helical scan magnetic tapes 8a containing the relevant VSNs are stored by referencing the directory 3.

Subsequently, the library control unit 2 searches a logical address of the helical scan magnetic tapes 8a of the cartridge IDs corresponding to the designated VSNs and the addresses of the usable buffers connected to the recording/reproducing apparatus 6 (step 104) and informs the host system of these addresses as searched (step 106).

However, if when it is found (step 103) that the helical scan magnetic tape of the cartridge ID in which the files of the designated VSNs is stored has already been mounted in the recording/reproducing apparatus 6, the helical scan magnetic tape 8a of the relevant cartridge ID and the address of the usable buffer 5 actually connected to the recording/reproducing apparatus 6 are determined (step 105) and identified to the host system 1 (step 106).

The host system 1 issues a plurality of cartridge transportation commands by using as parameters the logical addresses and the buffer addresses of the helical scan magnetic tapes 8a (step 107). The library control unit 2 performs a mounting operation for one or more recording/reproducing apparatuses having the buffer addresses allocated to the designated helical scan magnetic tapes 8a. When the helical scan magnetic tape or tapes 8a of the designated cartridge ID have already been mounted on the corresponding recording/reproducing apparatus(es) 6, the current transportation processing comes to an end without transportation of the cartridge (steps 108 to 110).

Upon completion of execution of the mounting command for the relevant recording/reproducing apparatuses, a command for positioning the magnetic head(s) at a leading end or ends of the relevant files is issued to the recording/reproduction control unit 4 from the library control unit 2 (step 111), whereupon a ready message is issued from the relevant buffer address (step 112). In this manner, the command issued from the host system 1 can be realized in such a manner as if a conventional magnetic tape was mounted.

When the mounting of the relevant cartridge is recognized, the host system 1 issues an access command to the relevant magnetic tape.

By way of example, it is assumed that a write command is issued. Data to be written is supplied from the host system and first written in the relevant buffers 5 (step 114). After the optimal write timing is scheduled by the recording/reproducing apparatus 6, the data placed in the buffers are written onto the relevant helical scan magnetic tape 8a. By the phrase "schedule of the optimal timing", such a timing schedule is meant in which, when data to be written in the file which is on the way of tape forwarding or rewinding for positioning the magnetic head at the target file is placed in a certain buffer 5, it is scheduled that the data is first written from the above-mentioned buffer onto the helical scan magnetic tape 8a.

On the other hand, when it is commanded to read the relevant helical scan magnetic tapes 8a (step 115), the reading sequence is controlled in conformance with the tape forwarding/rewinding operation in response to a plurality of read requests. In that case, the files which are out of the reading sequence are transferred to the buffer(s) 5. During the file transfer to the buffer(s) 5, the recording/reproduction control unit 4 issues a command retry message with the read operation being left in the waiting state.

Upon completion of transfer of the files to be read in the buffers 5, a transfer completion message is issued to the host system to which the command retry message was issued. Upon reception of this message, the host system 1 issues the read command which was not accepted, as indicated by the command retry request. In response, the recording/reproduction control unit 4 transfers the data to the host system 1 from the buffers 5 (step 116).

In these read/write processings, each of the files is transferred to each buffer 5 and the response is made from each buffer 5 to the access request of the host system. Thus, even when accesses occur simultaneously to a plurality of files contained in a single volume of helical scan magnetic tape to which the mount request is being issued, such a situation in which these accesses are deadlocked can be evaded without fail, to an advantage.

Further, owing to the read/write processings performed through the medium of the buffers 5, the magnetic head is inhibited from remaining constantly at a predetermined place, as a result of which the helical scan magnetic tape 8a is protected against wear or abrasion. Thus, reliability of the helical scan magnetic tape 8a is enhanced, to a further advantage.

The directory 3 provided for the library control unit 2 contains as the medium management information such statistic data as to the number of times the volume or tape has been mounted, error rate, the number of read/written blocks and other information. These data can be updated by utilizing an interface between the recording/reproduction control apparatus 4 and the library control unit 2.

Figure 4:
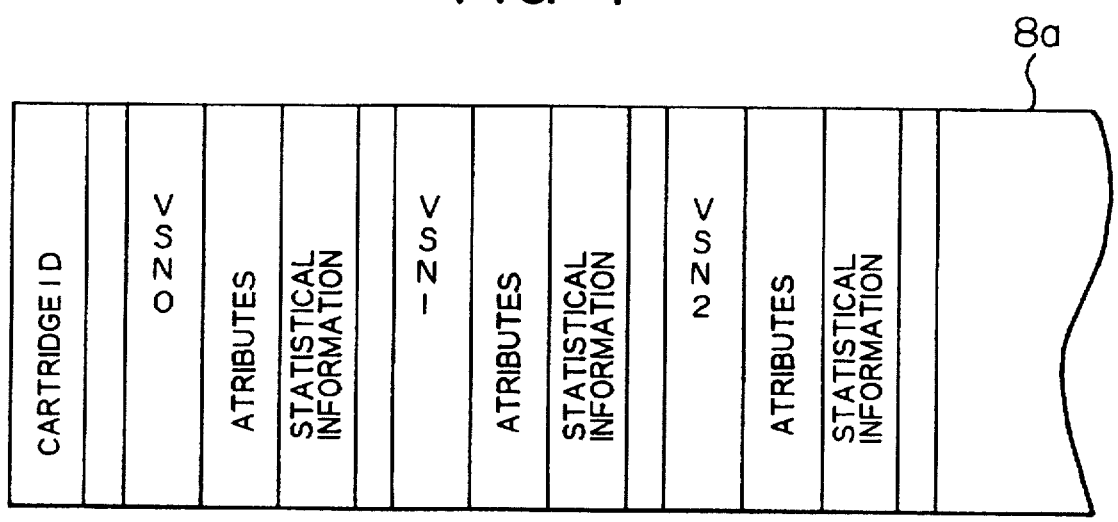
FIG. 4 is a conceptional view showing an example of control information saved or copied onto a multifile storage medium.

The medium management information is also written on the helical scan magnetic tape 8a, as is exemplarily shown in FIG. 4, for the purpose of restoring the data which may be destroyed due to defects of the directory 3.

Writing of these data on the tape is performed by the library control apparatus 2 via the recording/reproduction control unit 4 at the time point when the helical scan magnetic tape 8a is demounted.

Upon actual demounting of the helical scan magnetic tape 8a (step 117), the management information such as attributes of individual files contained in the directory 3 for the library control unit 2 is written onto the helical scan magnetic tape 8a only when all the files contained in the helical scan magnetic tape of concern are not being subjected to processing operations such as read, write or the like. Thereafter, the helical scan magnetic tape 8a having the management information recorded thereon is returned to the storage shelf 8. At that time, when any other file undergoing other processing exists in the same helical scan magnetic tape 8a, the demount processing comes to an end without performing any demounting operation.

Various features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, the multifile type recording medium is not restricted to the helical scan magnetic tape but encompasses a large capacity storage or recording medium such as an optical disk.

Typical advantageous effects obtained by the present invention may be summarized below.

The multifile storage medium access method according to the invention can avoid problem of deadlock, and simultaneous accesses to a plurality of files stored in the multifile storage medium can be realized to advantageous effect.

Further, the library system according to the invention can handle a multifile storage medium such as a volume of helical scan magnetic tape or the like as if it were a plurality of unity files such as conventional or common magnetic tapes or the like for the host system, whereby the multifile storage medium can be managed and utilized without need for modification or alteration for a control program of the host system and the interface.

Besides, by virtue of such arrangement that a plurality of unity files stored in the same multifile storage medium are independently transferred to the buffers which can be accessed independently of one another, wherein the access request to the file can be disposed of within the buffer, there arises no problem of deadlock, whereby a plurality of files can be accessed simultaneously, to further advantageous effect.

We claim:

1. A library system comprising:
   at least one portable multifile storage medium storing a plurality of files each file being managed with respective independent identification symbols;
   a shelf for housing multifile storage media;
   at least one storage medium driving means for performing an information recording/reproducing operation for said multifile storage medium;
   handling means for performing transportation of said multifile storage medium between said medium driving means and said shelf;
   control information storing means for recording control information indicating correspondence between said identification symbols and said multifile storage medium;
   control means for mounting/demounting said multifile storage medium on/from said storage medium driving means on the basis of an identification symbol received from a host system and said control information; and
   a plurality of buffers shared by said at least one storage medium driving means, said buffers being capable of being accessed independently of one another;
   wherein given one(s) of said plural files are transferred to the individual buffers on a file-by-file basis so that access requests for said plural files are disposed of in parallel with said buffers.

2. A library system according to claim 1, further comprising:
   means for optimizing said plurality of access requests so that said plural access requests conform to a physical sequence in which said plural files stored in said multifile storage medium are accessed by suspending correspondingly a plurality of access requests for a plurality of said files stored in said multifile storage medium.

3. A library system according to claim 2, wherein said control information stored in said control information storage means is recorded on a portion of said multifile storage medium.

4. A library system according to claim 3, wherein said multifile storage medium is a helical scan magnetic tape or an optical disk.

5. A library system according to claim 2, where n said multifile storage medium is a helical scan magnetic tape or an optical disk.

6. A library system according to claim 1, wherein said control information stored in said control information storage means is recorded on a portion of said multifile storage medium.

7. A library system according to claim 6, wherein said multifile storage medium is a helical scan magnetic tape or an optical disk.

8. A library system according to claim 1, wherein said multifile storage medium is a helical scan magnetic tape or an optical disk.

9. A library system, comprising:
   at least one portable multifile storage medium storing a plurality of files, each file being managed with respective independent identification symbols;
   a shelf for housing a plurality of multifile storage media;
   at least one storage medium driving means for performing an information recording/reproducing operation for said multifile storage medium;
   handling means for performing transportation of said multifile storage medium between said medium driving means and said shelf;
   control information storing means for recording control information indicating correspondence between said identification symbols and said multifile storage medium;
   control means for controlling said handling means to effect mounting/demounting of said multifile storage medium on/from said storage medium driving means on the basis of an identification symbol received from a host system and said control information; and
   means for optimizing said plurality of access requests so that said plural access requests conform to a physical sequence in which said plural files stored in said multifile storage medium are accessed by suspending correspondingly a plurality of access requests for a plurality of said files stored in said multifile storage medium.

10. A method of accessing portable multifile storage media from a shelf, each multifile storage medium storing a plurality of individual files, said files each having respective independent identification symbols, comprising the steps of:
    storing correspondence relations between an identification symbol of each file and the medium in which said files are stored;
    loading, upon receiving a movement instruction indicative of a file designation from one or more host computers, a medium having the designated file or files stored therein into a driving means for performing a recording/reproducing operation for a portable multifile storage medium;
    transferring individual files stored in said loaded medium on a file-by-file basis between said multifile storage medium and a plurality of buffers which can be accessed independently of one another; and
    processing access requests from said one or more host computers to said individual files in parallel within said buffers.

* * * * *